UNITED STATES PATENT OFFICE.

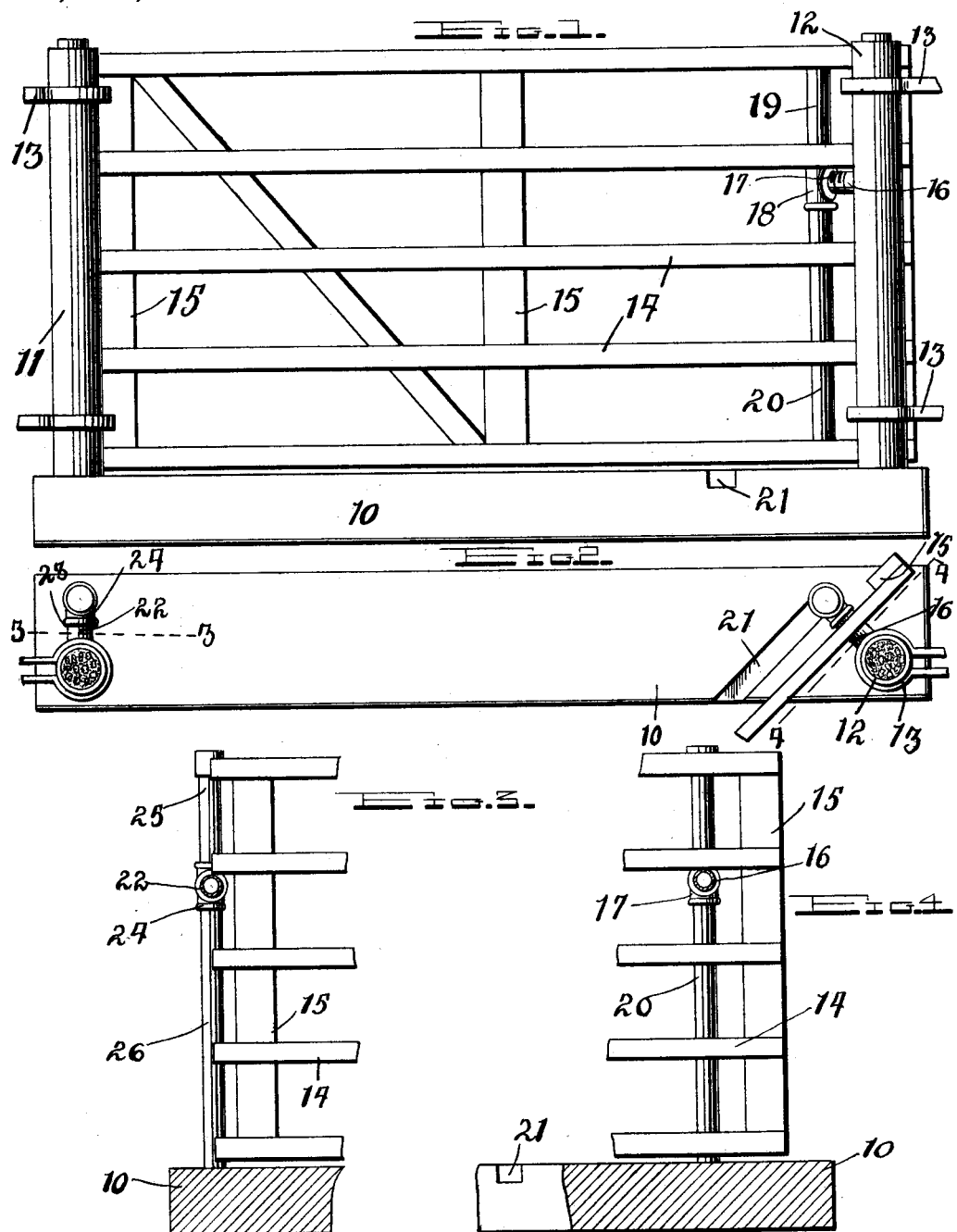

JOHN C. ZOLL, OF NORTHSTAR, MICHIGAN.

GATE.

1,075,890.  Specification of Letters Patent.  Patented Oct. 14, 1913.

Application filed March 6, 1913. Serial No. 752,457.

*To all whom it may concern:*

Be it known that I, JOHN C. ZOLL, a citizen of the United States, residing at Northstar, in the county of Gratiot, State of Michigan, have invented certain new and useful Improvements in Gates; and I do hereby declare the following to be a full, clear, and exact description of the invention, such as will enable others skilled in the art to which it appertains to make and use the same.

This invention relates to gates.

The object of the invention resides in the provision of a gate structure whereby an ordinary slat gate may be associated with a wire fence with ease and facility.

A further object of the invention resides in the provision of a gate of the character named in which supporting hinges are dispensed with and the gate adapted to have a loose and swinging engagement with one of the gate posts.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a front elevation of a gate constructed in accordance with the invention, the gate being shown in closed position; Fig. 2, a plan view of what is shown in Fig. 1 with the gate in open position, the free end of the gate being broken off; Fig. 3, a section on the line 3—3 of Fig. 2 with the gate in closed position, and Fig. 4, a section on the line 4—4 of Fig. 2 with the gate in open position.

Referring to the drawings the gate is shown as comprising a sill 10 in which is detachably mounted in suitable recesses in the sill adjacent main posts 11 and 12. These posts 11 and 12 have secured thereto in a suitable manner wire fence sections 13. The gate proper is shown as comprising horizontal slats 14 connected together by vertical members 15, the slats at one end projecting beyond the adjacent limiting vertical member. Projecting laterally from the main post 12 is an arm 16 the outer end of which is threaded as at 17. Mounted on the threaded ends of the arms 16 is a T-joint 18 and threaded in the arms of this joint are upper and lower members 19 and 20 respectively of a supplemental post. The lower end of the lower member 20 is engaged in a groove 21 in the upper side of the sill 10 which extends diagonally of the longitudinal axis of the sill. It will be noted that the arm 16 also extends diagonally of the longitudinal axis of the sill so as to permit free swinging movement of the gate as will hereinafter appear. Projecting laterally from the main post 11 is an arm 22 the free end of which is threaded as at 23. Engaged on the threaded end of the arm 22 is a T-joint 24 and threaded in the arms of this joint are upper and lower members 25 and 26 respectively of another supplemental post. The lower end of the lower member 26 is engaged in a suitable recess in the upper side of the sill 10, the position of said recess being such as to dispose the arm 22 at right angles to the longitudinal axis of the sill 10.

In applying the gate in position the supplemental post formed by the members 19 and 20 and the T-joint 18 is rotated to a horizontal position and then inserted between desired adjacent slats 14 of the gate when it is again returned to vertical position. With the gate thus mounted between the last named supplemental post and the post 12 it will be apparent that same may be swung into longitudinal alinement with the sill 10 and then slid longitudinally so as to engage the arm 22 between the ends of adjacent slats 14. With the gate in this position it will be secured in closed position. If it is desired to open the gate it is only necessary to slide same longitudinally so as to disengage the free end thereof from between the main post 11 and the supplemental post formed by the upper and lower members 25 and 26 respectively and the T-joint 24. The gate can then be swung to the position shown in Fig. 2 without interference by the main post 12 and supplemental post formed by the upper and lower members 19 and 20 and the T-joint 18.

What I claim is:—

In a gate structure the combination of a sill, spaced main posts mounted on said sill, arms projecting laterally from said main posts respectively intermediate the ends of the main posts and having their outer ends threaded, one of said arms being disposed diagonally of the sill and the other arm at right angles thereto, a supplemental post rotatably engaged with the threaded ends of the diagonal arm and having its lower end seated in a groove in the sill, a second supplemental post secured to the threaded end of the other arm and having its lower end seated in a recess in the sill, and a gate including spaced horizontal slats through which the diagonal arm is engaged.

In testimony whereof, I affix my signature, in the presence of two witnesses.

JOHN C. ZOLL.

Witnesses:
WILLIS WEBSTER,
BURR BETTS.

Copies of this patent may be obtained for five cents each, by addressing the "Commissioner of Patents, Washington, D. C."